United States Patent Office 3,324,961
Patented June 13, 1967

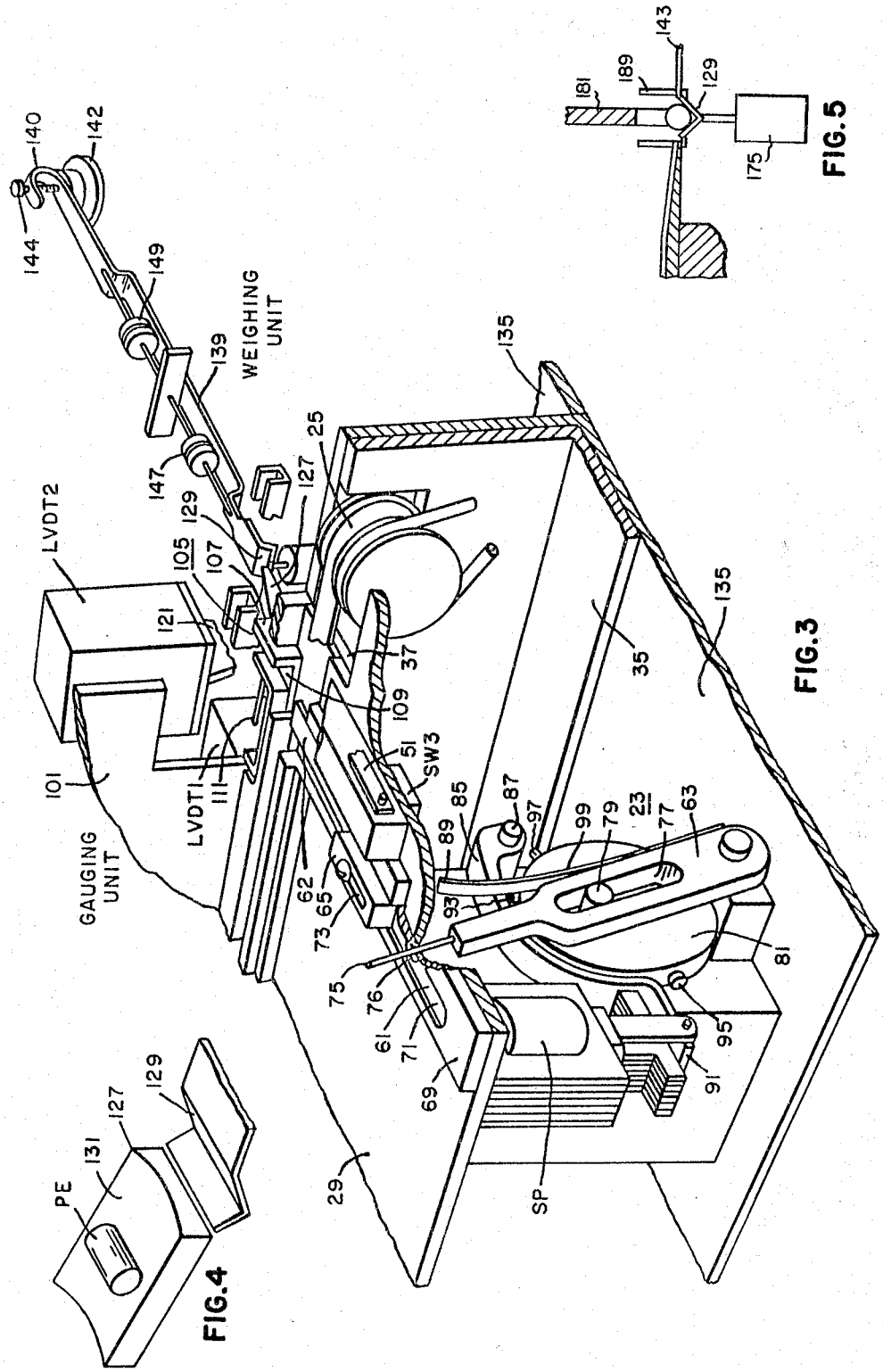

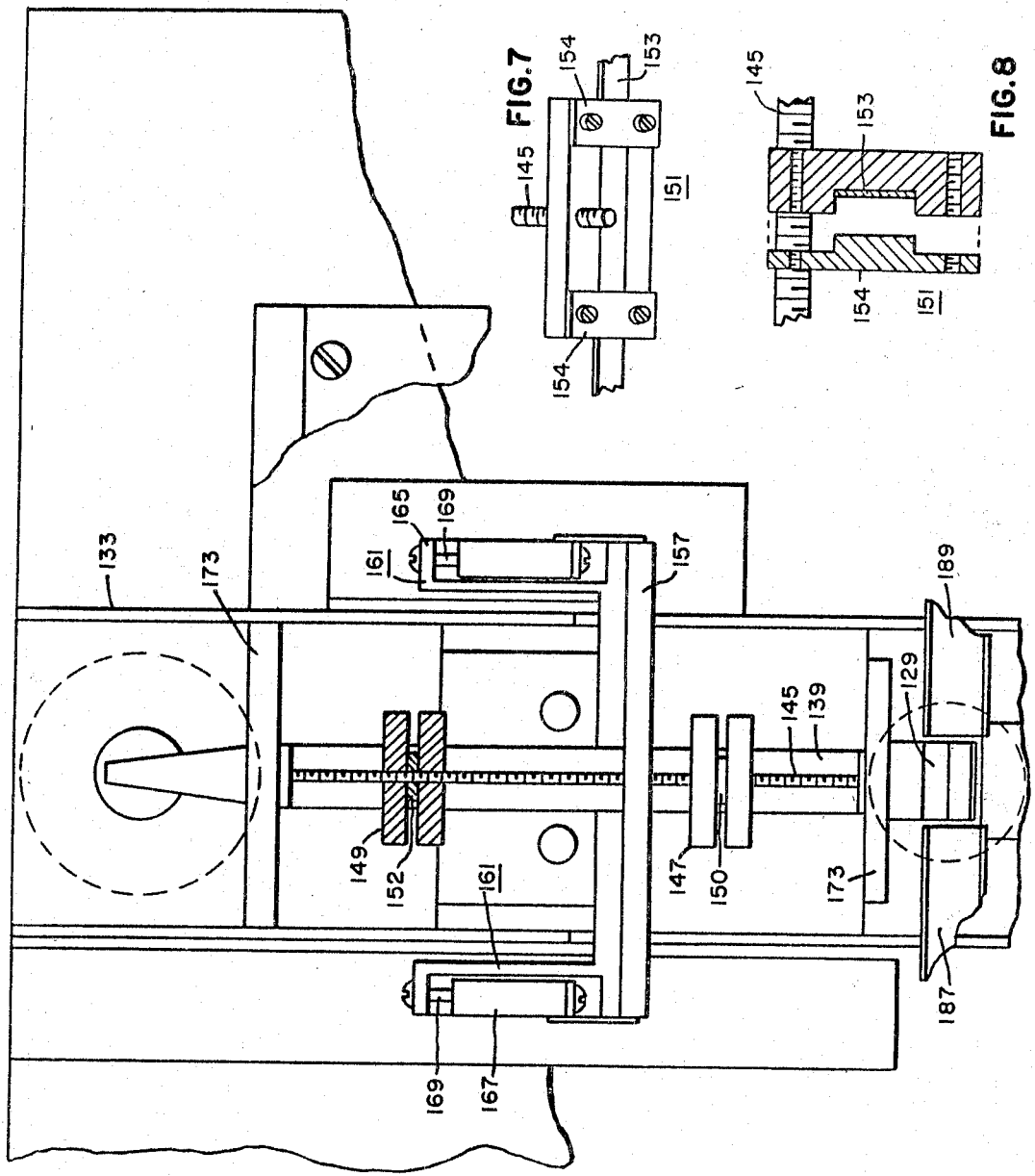

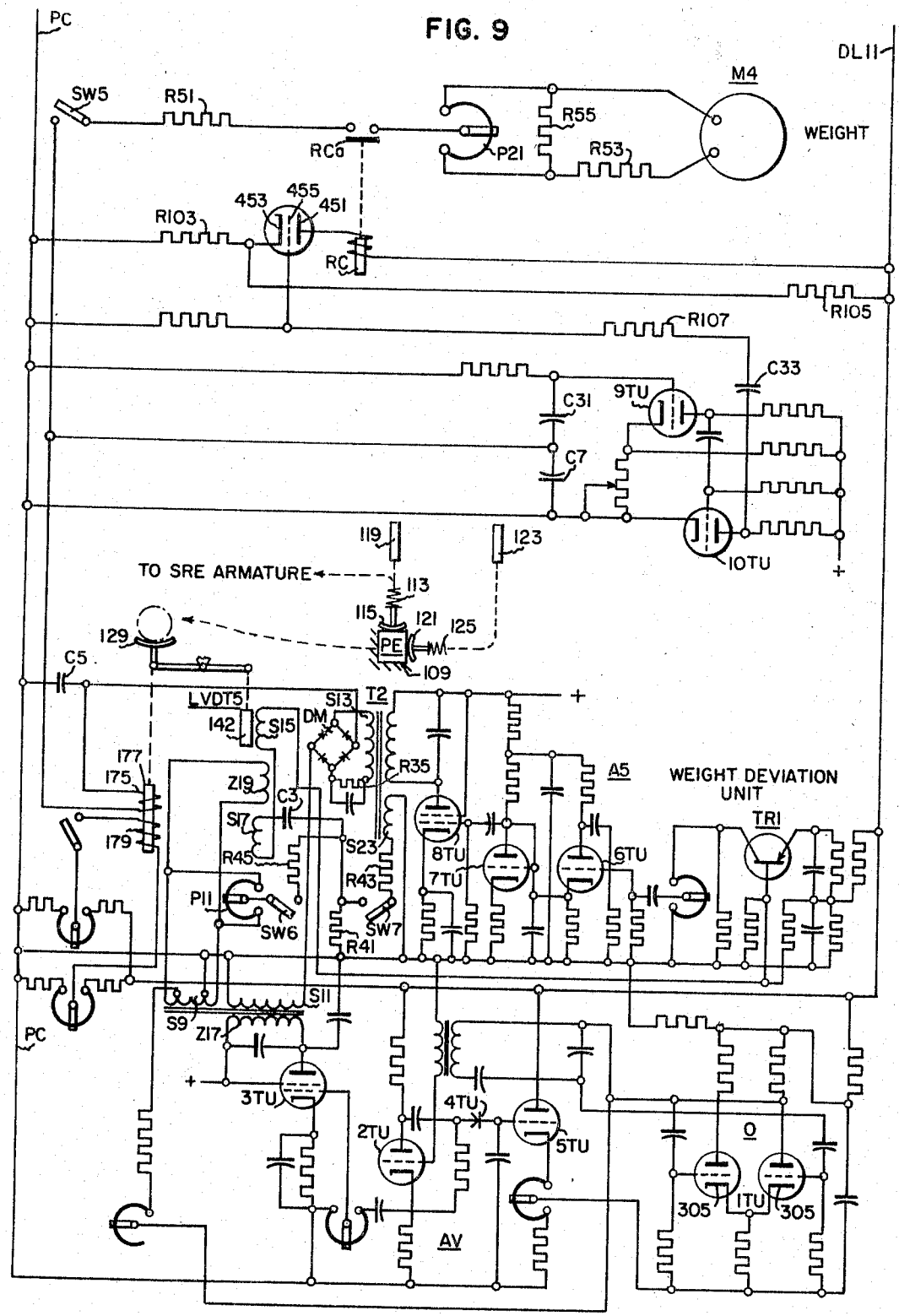

3,324,961
PROCESSING SYSTEM WITH SEQUENCING
MEANS AND WEIGHER HAVING OSCIL-
LATION SUPPRESSING MEANS
Wallace Jones, Saltsburg, Pa., assignor to Nuclear Materials and Equipment Corporation, Apollo, Pa., a corporation of Pennsylvania
Original application Mar. 14, 1961, Ser. No. 108,220, now Patent No. 3,221,152, dated Nov. 30, 1965. Divided and this application Dec. 2, 1964, Ser. No. 423,884
4 Claims. (Cl. 177—185)

This application is a division of application Ser. No. 108,220, filed Mar. 14, 1961, now Patent No. 3,221,152 granted Nov. 30, 1965.

The parent patent relates to the classification art and has particular relationship to the classification of objects in accordance with their respective densities. Among other problems the parent patent concerns itself with the detection of small deviations in density of objects from a standard or norm. This invention deals particularly with the determination of the weights of the objects as a part of the density determination.

Nuclear reactors include fuel assemblies the basic fuel element of which is a pellet of a fissionable material. It is essential that the density of these elements be maintained within tight tolerances to avoid over or under concentration of neutronic reaction, and it is a specific object of this invention to provide weight and displacement measuring apparatus for use in classifying such elements so as to select for neutronic use only those elements having densities within such tight tolerances.

To achieve the desired precision weight measurements are, in accordance with this invention, effected with the aid of a linear variable differential transformer herein designated as LVDT. Such a transformer usually includes a primary comprising a pair of oppositely connected windings, a secondary and a core. The primary may be supplied with alternating current and the core is by the measuring mechanism. With the core properly centered there is no output in the secondary; with the core displaced from the center, voltage dependent on the displacement is induced in the secondary. The measurement is effected by measuring or balancing the induced secondary voltage.

Weight of pellets is measured according to this invention by a scale on which the movement of the weighing arm is measured by an LVDT and is balanced out to give percent deviation of weight.

The invention in detail, both as to its organization and as to its method of operation, together with the objects and advantages thereof, will be understood from the following description of specific embodiments of this invention taken in connection with the accompanying drawings, in which:

FIG. 3 is a view in isometric similar to FIG. 2 but showing the mechanism for advancing the pellets into the gauging unit and into the weighing unit;

FIG. 4 is a fragmental view showing the channel between the gauging unit and the weighing unit of the apparatus shown in FIG. 2;

FIG. 5 is a fragmental view in side elevation showing the scale pan of weighing unit of the apparatus shown in FIG. 2 and its associated balancing coil;

FIG. 6 is a view in top elevation of the weighing scale of the apparatus shown in FIG. 2;

FIGS. 7 and 8 are fragmental views showing details of this scale; and

FIG. 9 is a schematic showing the electrical circuit of the apparatus according to this invention.

Figure 1:
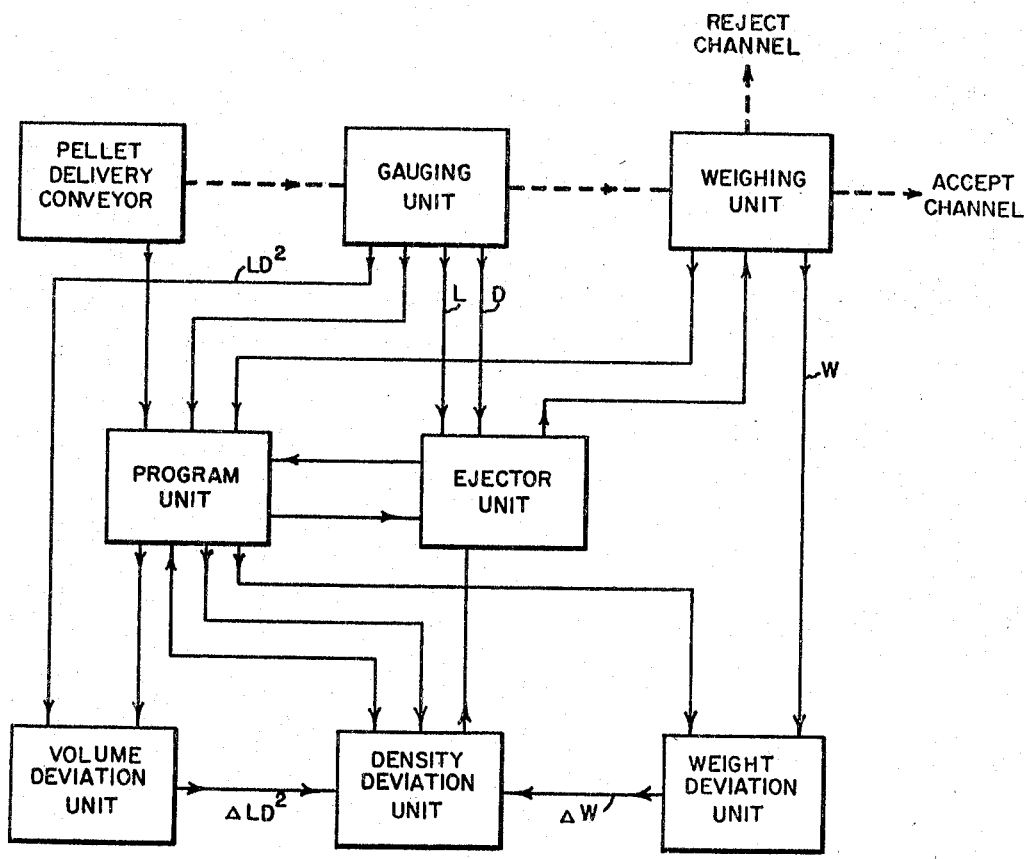
FIGURE 1 is a block diagram showing the principal components of apparatus disclosed in the parent patent in which this invention is incorporated.

In FIGS. 1 through 8 this invention is illustrated as applied to the processing of generally cylindrical fuel pellets for nuclear reactors. FIGS. 1 through 8 are those figures of the parent patent that are necessary for the understanding of the invention here claimed; for elaboration reference is made to the parent patent. FIG. 1 shows the components of the invention of the parent patent as blocks. The broken line arrows between the blocks present the mechanical movement of the pellets; the full-line arrows the flow of electrical information.

The pellets PE (FIG. 2) are delivered by a pellet delivery conveyor to the gauging unit where the diameter, D, and the length, L, are measured and $LD^2$ is computed. From the gauging unit the pellets are delivered to a weighing unit where each pellet is weighed. From the weighing unit each pellet is transferred either to an accept channel or to a reject channel depending on the operation of the ejector unit.

The ejector unit (shown in parent) operates on each pellet after the weighing operation and its operation depends on the electrical information which it receives. The gauging unit sets the ejector unit to reject, through information channels L or D if L or D respectively exceed preset limits. In addition the gauging unit sends the product $LD^2$ for each pellet to the volume deviation unit where the product is compared with the similar product for a standard. The volume deviation $\Delta LD^2$ thus derived is transmitted to the density deviation unit.

The operation in the weighing unit leads to the transfer of weight information for each pellet to the weight deviation unit which transfers the weight deviation $\Delta W$ to the density deviation unit. The latter calculates the density deviation, $\Delta W - \Delta LD^2$, and transfers information to the ejector unit if the density deviation exceeds preset limits.

If the ejector unit receives no information of exceeded limits for length, diameter or density deviations it ejects the pellet into the accept channel; if the ejector unit receives information that L, D or $\Delta W - \Delta LD^2$ exceed preset limits it ejects the pellet into the reject channel. The sequencing of the mechanisms which move the pellets PE through the gauging unit and weighing unit and which operate the ejector unit at the proper time is controlled by the program unit. The program unit also operates to prevent the jamming of the pellets PE in the gauging unit.

The pellet delivery conveyor (FIG. 2) includes a continuous belt 21 for moving the pellets PE to a position where they are advanced to the gauging unit and an indexing mechanism 23 for advancing them into the gauging unit from this position. The belt 21 is driven from a motor (not shown) through pulley 25 (FIGS. 2 and 3) at one end of its path and passes over pulley 27 (FIG. 2) at the other end of its path.

The belt 21 is moved over the top 29 of a table 31. The pulleys 25 and 27 are rotatably supported on horizontal bearings (not shown) from a plate secured to the angle-bracket legs 35 of the table on one side. The pulley 25 is below an opening 37 in the top 29 of the table 31 and the pulley 27 is beyond the end of the top 29. The pulleys 25 and 27 are so positioned that the belt 21 is moved just above the top 29.

Strips 39 extend parallel along the path of the belt 21. The distance between the inner edges of the strips 39 is just greater than the width of the belt 21 so that the belt moves freely between them. Rails 41 are secured (for example by welding) to the strips so that they overhang the strips and extend over the belt 21. The pellets PE move in direction parallel to their long dimensions (axis) and the rails 41 serve the double purpose of holding down the belt and aligning the pellets PE.

The gauging unit communicates with the belt 21 through an entrance or channel 43 (FIG. 2) along which the pellet PE is moved at right angles to its motion along the belt. At the entrance 43 a stop assembly 45 is provided just over the belt 21. This assembly includes a bar 47 of insulating material generally at right angles to the belt 21 and extending over the belt. An angle 49 of insulating material extends over the end of the bar 47 over the belt 21 overhanging the bar 47 at the end remote from the pellet channel 43. A spring 51 is mounted along the side of the bar 47 remote from the pellet channel 43. This spring 51 is the operating member of a switch SW1 (FIG. 2) which is actuable by each pellet PE as it approaches the entrance 43.

The spring 51 extends over the belt 21 opposite an opening 53 in the bar 47 and carries a pin 55 (FIG. 2) which extends through the opening 53 and is actuable by each pellet PE as it is advanced to a position opposite channel 43. The spring 51 also carries a contact tip 57 adapted to engage a cooperative contact 59 (FIG. 2) when the spring 51 is actuated by a pellet PE. The tip 57 and the contact 59 together constitute switch SW1. The closing of the switch SW1 by a pellet signals that a pellet is in a position to be injected into the Gauging Unit.

The indexing mechanism 23 (FIG. 2) includes a slider 61 which is reciprocated from a scotch yoke 63 (FIG. 3). The slider 61 is adjustably secured to a pusher plate 62 from which a slotted block 65 extends integrally. The slider 61 is slideable on top 29 in a track (not shown) in elongated slotted guide 69. The block 65 extends through the slot 71 of guide 69. The pusher 62 extends from block 65 along the slot 71 into entrance or channel 43 in a position such as to advance each pellet which actuates SW1 into the Gauging Unit. The position of the end of pusher 62 in the entrance 43 may be set by securing the block 65 at the proper position along the slot 73 to the slider 61.

The slider 61 (FIG. 3) is driven from the yoke 63 through a pin 75 extending from the yoke 63 and engaging the plate 67 through a sutable low friction fiber (Teflon or nylon) washer 76. The yoke 63 has a slot 77 and is reciprocable by a pin 79 extending eccentrically from a disc 81 rotated by a motor MO2 (not shown) through a slip clutch (not shown).

The indexing mechanism 23 also includes a pawl 85 (FIG. 3) suspended to pivot about a pin 87 by which it is secured to a plate 89 extending downwardly from top 29. The other end of the pawl 85 has a lip 91 linked to an armature actuable by pawl solenoid SP (FIG. 3) extending donwardly from the top 29. The pawl 85 has a stop 93 intermediate the pivot 87 and the lip 91 which is adapted to engage pins 95 and 97 displaced along the rim of the disc 81. With solenoid SP deenergized the pawl 85 drops downwardly under gravity so that the stop 93 then engages pin 95 or 97. In this position of the mechanism 23 the motor (not shown) rotates but the clutch (not shown) slides.

The yoke 63 carries a spring 99 which in the forward position of the yoke 63 actuates a limit switch SW3 suspended from the underside of the top 29. The limit switch SW3 is used in sequencing the classifying operation as disclosed in the parent application. The yoke 63 reciprocates the pusher 62.

The yoke 63 has an initial or standby position at which pin 97 engages the stop 93 and an advanced position in which the pin 95 engages the stop 93. In the operation of the apparatus the solenoid SP is instantaneously actuated on two occasions during the processing of each pellet. The first actuation releases pin 97 from stop 93 permitting the yoke 63 to cause pusher 62 to move the pellet PE into the gauging unit. SP is immediately deenergized after this actuation so that pawl 85 drops down causing pin 95 to be engaged by stop 93. The pusher 62 remains adjacent the pellet PE in the gauging unit until the second actuation of solenoid SP. This releases pin 95 resetting the yoke 63 to the initial position. During its motion to the initial position the yoke moves pusher 62 forward so that it pushes the pellet PE out of the gauging unit into the weighing unit and then returns the pusher 62 to the initial position. The switch SW3 is actuated in the advanced position of the yoke and this operation results in the required sequencing as disclosed in the parent patent.

The gauging unit is supported from vertical plate 101 secured to the channel 35 which serves as support for the top 29 and from a triangular plate (not shown) secured at right angles to the vertical plate.

Figure 2:
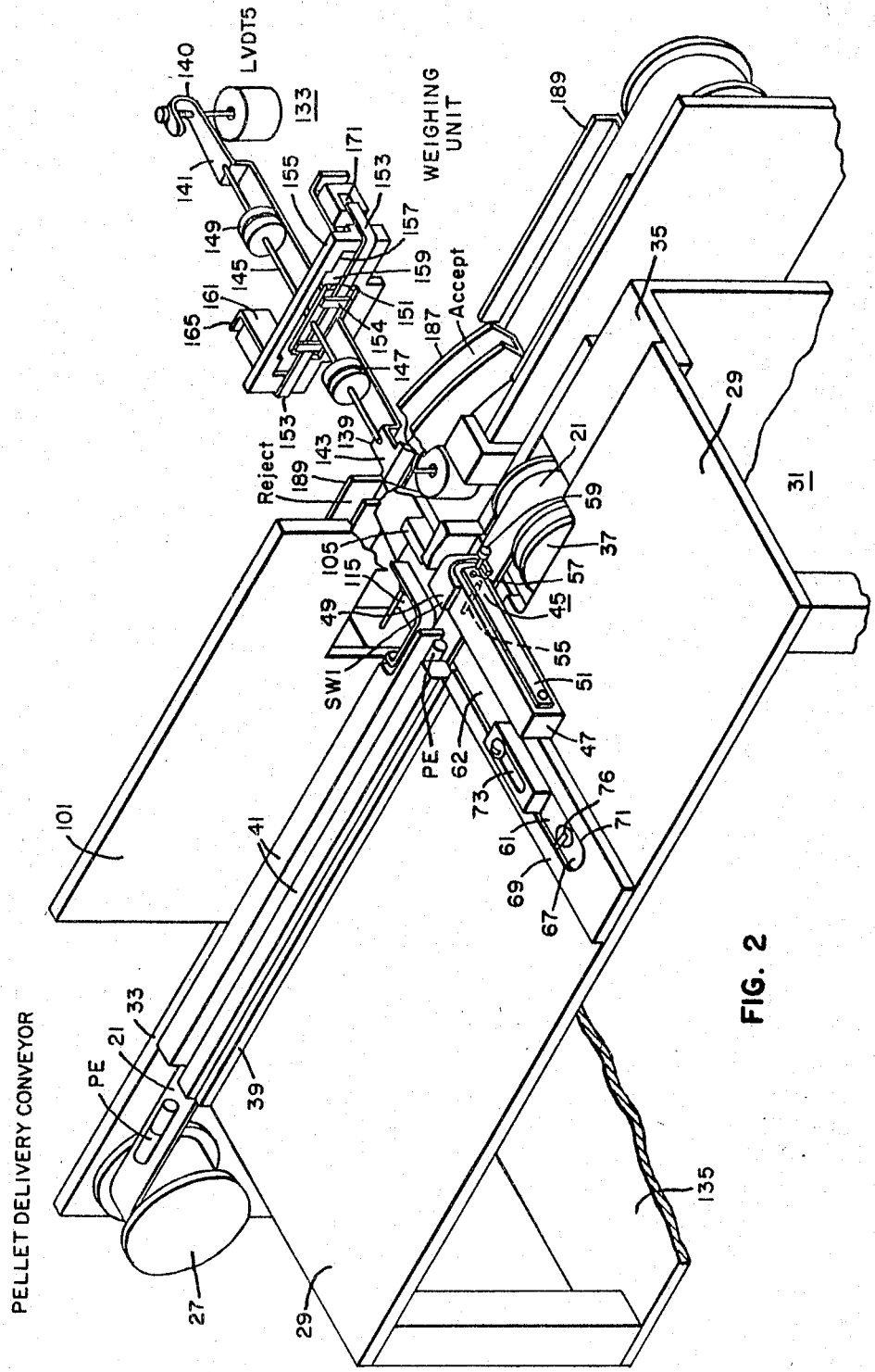
FIG. 2 is a view in isometric of classifying apparatus in which this invention is incorporated.

The gauging is carried out with the pellet PE on an angle plate 105 of stainless steel supported on the triangular plate. A pellet PE in gauge is urged against the vertical wall 107 of the plate 105 in measuring the length and against the base 109 in measuring the diameter. The surface of the base 109 is coextensive with the belt 21 at the entrance channel 43 (FIG. 2). The length of each pellet PE is gauged with the aid of, a linear variable differential transformer, LVDT1, which is mounted on plate 101 opposite the wall 107. The length feeler 111 extends from base 109 from LVDT1 in a direction perpendicular to the surface 107 and is urged towards this surface by a spring 113 (FIG. 9). The tip of this feeler 111 operates through a rectangular leaf spring 115 (FIG. 2) which is suspended from the support for LVDT1. The feeler 111 is connected to the core 119 of LVDT1. A solenoid SRE (FIG. 9) is connected to feeler 111 to retract this feeler when the pellet PE is to be ejected from the gauging unit.

The diameter is gauged with the aid of LVDT2 which is mounted on plate 101 directly over the center portion of base 109. The diameter feeler 121 (FIG. 3) is connected to the core 123 of LVDT2 and is urged in a direction perpendicular to the surface of 109 by a spring 125.

Between gauging operations the feeler 121 is set so that its distance from surface 109 is just smaller than the diameter of diameter pellet PE. Also, at all times, except when the pellet is being ejected from the gauging unit, the retract solenoid SRE is deenergized and the feeler 111 is set so that the tip of spring 115 is spaced from surface 107 a distance just shorter than the length of the shortest pellet PE. During operation a pellet PE is thrust between the spring 115 and surface 107 and feeler 121 and surface 109 by pusher 62. After the gauging operation the feeler 111 is retracted so that when the pusher 62 pushes the pellet PE out of gauge into the weighing pan 129 of the weighing unit the pellet PE is not deflected. The pan 129 is in the form of a V groove and the channel 127 has a generally concave surface 131 (FIG. 4) forming a cylindrical concavity, the axis of which is generally perpendicular to the long dimension of the pan 129. The pellet PE thus moves along the channel 127 into the pan 129 without being turned.

The weighing unit (FIG. 6) is mounted between the flanges on one side of an I-beam 133 supported on the lower plate or deck 135 of the table 31. The weighing unit includes a generally channel shaped strip 139, the ends of which are bent to form the pan 129 at one end and a rigid generally U-shaped connection 140 to the core 142 of LVDT5 (FIGS. 2 and 9) through a screw 144 at the other end. A threaded rod or arm 145 extends between the bent up ends of the strip 139. The arm 145 carries weights 147 and 149 on both sides. These weights may be set along the rod 145 for balancing. Each pair of weights 147 and 149 is separated by a resilient washer 150 and 152.

The rod 145 passes through a plate 151 centrally at the upper rim of the plate and is secured to this plate 151 (FIG. 2). The plate 151 serves to support the pivot bearing of the beam 139 which is a band 153 of stainless steel or other metal (about .005 inch thick) engaging the plate 151 in a longitudinal groove and secured to the plate 151 by straps 154 secured to the plate across the ends of the groove.

The beam support is a generally U-shaped bracket 155 having a vertical center portion 157 with a window 159 (FIG. 2) and having legs 161 with bent-over feet or lips 165. The center portion 157 is secured to the web of the I-beam 133 so that it is vertical. The fastening means (not shown) is such as to minimize distortion of the beam 139 from thermal expansion. The legs 161 extend cantilever fashion from the center 157. The beam support also includes stirrups 167 in the form of blocks. Each stirrup 167 is seated in leg 161 adjacent the associated lip 165 and is moveable along the leg by a screw 169 which passes through the associated lip 165 and screws into the stirrup. Each stirrup 167 also has a hole 171 (FIG. 2) near the end adjacent the center 157. The band 153 wraps around the rounded edges of the center 157 of the bracket 155, passes through the holes 171 and is secured to the ends of the stirrups 167 adjacent the center 157. The band 153 is tensioned by moving the stirrups towards the lips 165. The plate 151 is free to pivot about its longitudinal axis in the window 159 as the beam 139 deflects and the band 153 is thus torsioned by the deflection of the beam and serves as a highly effective scale bearing. The torsion is very small; about 6 minutes. The deflection of the beam 137 is limited by yokes 173 which extend over the beam 139 near the ends where the beam is bent.

The weighing is effected by balancing the scale. For this purpose a balancing coil 175 (FIGS. 5 and 9) is provided to reset the pan 129 to the balanced position. The coil 175 acts on a permanent-magnet core 177 (FIG. 9) connected to the pan 129. A trimming coil 179 is also coupled to the core 177 for precise setting. The trimming coil 179 and balancing coil 175 are mounted in the web of the I-beam 133 just under the pan 129 and the core 177 extends from the center of the pan 129 through the coils 175 and 179.

The pellets PE are ejected from the pan 129 along the accept or reject channels by operation of the ejector unit (not shown) in one direction or the other. The accept channel includes a guide 187 communicating with the pan 129 along which the accepted pellets PE move and the reject channel includes a like guide 189.

The volume deviation unit is disclosed in detail in the parent application.

The weight deviation unit includes an audio frequency power supply and an amplifier A5 (FIG. 9). The audio frequency is about 2000 cycles per second and is derived from a suitable oscillator 0 including double triode 1TU. The output of the oscillator 0 is connected to the input of a cathode-follower including tube 2TU; the output of the cathode-follower controls a power pentode 3TU. The power pentode 3TU feeds the supply transformer T1 having primary Z17 and secondaries S9 and S11. The supply includes an automatic volume control circuit AV which includes diode 4TU and triode 5TU. Triode 5TU controls the level of the cathodes 305 of 1TU. 5TU and 2TU may be a double triode.

The amplifier A5 includes a low-impedance-input amplifier circuit including transistor TR1. The output of this circuit is amplified by cascade amplifier including tubes 6TU and 7TU and power pentode 8TU.

The weight deviation unit also includes a demodulator DM. Opposite conjugate terminals of demodulator DM are supplied through a network including a capacitor C1 and a resistor R35 from the secondary S13 of the output transformer T2 of amplifier A5. The other opposite conjugate terminals are supplied from secondary S11 of transformer T1. The primary Z19 of LVDT5 is supplied from the secondary S9 of T1. The primary is loaded by P11. The secondaries S15 and S17 are connected bucking to the input of amplifier A5 through D.C. blocking capacitor C3 and through a feedback resistor R41. R41 is adapted to be supplied from feedback secondary S23 of transformer T2 through a resistor R43 and switch SW7.

With switch SW7 closed negative stabilizing feedback is injected into the input circuit of A5. Such feedback is used ordinarily when the scale is used alone; when the scale is used in the complete system SW7 is open. Alternating current from P11 is also injected through SW6 and R45 to counteract spurious current.

The output of DM produces a potential which in polarity and magnitude is dependent on the phase and amplitude of the output of A5. Thus the output of DM is a direct-current potential which in amplitude measures the extent of the displacement of the core 142 and in polarity indicates the direction of displacement from an initial setting.

When the pellet PE drops into the pan 129 a sharp impulse is produced on the weighing mechanism. Such an impulse would tend to cause hunting of the weighing mechanism. An important feature of this invention is the impressing on the weighing coil 175 (FIG. 9) from DM of a damping impulse which suppresses the hunting. This damping impulse is short but of very high amplitude compared to the impulse impressed by the pellet PE; the ratio being of the order of 1,000,000 to 1. The power pentodes 3TU and 8TU would tend to produce instantaneous power of this relative magnitude.

The output of DM is adapted to be connected to the adjustable arm of a potentiometer P21 through the weighing coil 175, the switch SW5, a resistor R51 and a front contact RCa of a comparison relay RC in the program unit (FIG. 9). The potentiometer P21 is connected to the weight deviation meter M4 through a resistor R23. P21 is shunted by a resistor R55. P21 is connected as shown in the parent application to cooperate in deviation determining density.

For the completion of a measurement by the weighing unit it is necessary that relay RC be actuated. This actuation is effected by the dropping of the pellet PE into the pan 129. The impact which the pellet PE produces as it drops into the pan 129 serves to produce an electrical impulse. This electrical impulse causes relay RC to be actuated. To derive the impulse the potential pulse produced at weighing coil 175 when the pellet PE drops into the pan 129 is impressed through coupling capacitor C31 in the input of a cascade amplifier which includes tubes 9TU and 10TU (FIG. 9). These tubes may be parts of a double triode. The output of this amplifier is impressed through capacitor C33 in the grid circuit of the scale thyratron 11TU (FIG. 9) rendering the latter conducting and actuating the compare relay RC. As disclosed in the parent patent the actuation of RC is part of the sequencing carried out by the program unit. During the programming the relay RC functions to actuate the density deviation unit to carry out a comparing operation.

The coil of RC is connected between DL11 and ground through SW4, the anode 451 and the cathode 453 of scale thyratron 11TU and a resistor R103. Thyratron 11TU is biased to non-conducting condition by a positive potential impressed in the cathode 453 through a resistor R105. This bias is conteracted by a potential impulse impressed on the grid 455 through a grid resistor R107 from the output of tube 10TU (FIG. 9) when a pellet PE drops in pan 129. Thus a weighing (and comparing) operation strats when the pellet drops in the pan by the closing of the circuit through coil 175. 11TU and relay RC are deenergized when SW4 opens. This happens when the pellet PE is moved from pan 21 into the accept or reject channel.

During standby the motors for the belt and the indexing unit 23 are energized and belt 21 is moving. Disc 81 is prevented from moving; the clutch 83 permits its motor to rotate relative to the disc 81. Switch SW1 is open. Switch SW3 is unactuated. After the apparatus is set up SW4 is opened so that 11TU, RL3 and RC are deenergized. Meter M4 is disconnected from the scale 137 by RCa. With SW3 unactuated SP and SRE are deenergized. The gauging unit is then set to receive and gauge a pellet PE.

To operate the apparatus pellets PE are deposited in succession on belt 21. The first pellet PE actuates switch SW1 when it arrives in position to be placed in gauge. This causes solenoid SP to be energized causing the pawl 63 to advance to its intermediate position injecting pellet PE in gauge. Since SW3 is at the beginning of this operation unactuated SRE remains deenergized. At the close of this operation SW3 is actuated. The actuation of SW3 deenergizes SP and also, at this point prevents energization of SRE. A gauging operation is carried out.

After the gauging operation the pawl 63 is returned to its initial setting on the way resetting SW3. The pellet PE receives an impact causing it to roll down guide 131 and to drop in pan 129. The resulting impulse renders 11TU conducting actuating RC. 11TU and RC remain actuated until SW4 is opened.

The actuation of RC causes a weighing operation and a density-deviation determining operation to be carried out.

Ultimately, SW4 is opened deenergizing 11TU and resetting RC.

While preferred embodiments of this invention are disclosed herein many modifications thereof are feasible. This invention then is not to be restricted except insofar as is necessitated by the spirit of the prior art.

I claim as my invention:

1. A processing system for an object including a plurality of processing means by which said object is processed in a predetermined sequence, said processing means including a scale for weighing said object having a pan, sequencing means connected to said processing means for actuating each of said processing means to process said object in said sequence, said processing means being actuated by said sequencing means to drop said object into said pan at the beginning of the weighing interval of said sequence, means connected to said pan and responsive to the dropping of said object into said pan for producing an electrical impulse, and means connected to said producing means and said sequencing means and responsive to said impulse for actuating said sequencing means to actuate said processing means to carry out the process following the beginning of said weighing interval.

2. Apparatus for processing an object including a weighing scale for said object having a pan into which said object is dropped producing an impact, electrical balancing means connected to said scale when conditioned for balancing said scale when said object is in said pan, means connected to said balancing means actuable to condition said balancing means to carry out a balancing operation and means connected to said scale and to said balancing means and responsive to said impact for actuating said actuable means to condition said balancing means to carry out a balancing operation, said actuating means also including means connected to said scale for suppressing mechanical oscillation of said scale produced by said impact.

3. Apparatus for processing an object including a weighing scale for said object having a pan into which said object is dropped producing an impact, said scale also having a weighing mechanism, the dropping of said object in said pan producing an impulse tending to cause hunting of said weighing mechanism, electrical balancing means connected to said scale for balancing said scale when said object is in said pan, electrical means connected to said scale and responsive to said object on said scale for producing an electrical signal including a decaying variable component superimposed on a constant component, and means connected to said balancing means for impressing said variable component on said balancing means to suppress mechanical oscillations of said scale resulting from the impressing of said impulse by said object and to impress said constant component thereon to balance said scale, said variable component having the effect of a damping impulse counteracting the impulse impressed on said scale by the dropping of said object, said impressing means including high amplifying means such that the ratio of the damping impulse to the impressed impulse is of the order of 1,000,000.

4. Precision weight measuring apparatus for weighing a plurality of objects in succession including a weighing balance having a pan into which said objects are successively dropped one by one to be weighed, means connected to said pan when conditioned for producing a weighing operation of an object in said pan, means connected to said producing means and responsive to the impact produced by each object as it is dropped into said pan for conditioning said producing means to produce a weighing operation, and means connected to said producing means and also responsive to said impact for suppressing oscillation of said pan resulting from said impact.

References Cited
UNITED STATES PATENTS

| | | | |
|---|---|---|---|
| 2,568,255 | 9/1951 | Schieser et al. | 209—121 |
| 2,914,310 | 11/1959 | Bahrs | 177—185 XR |
| 2,934,751 | 4/1960 | MacGeorge | 340—199 |
| 3,017,992 | 1/1962 | Matti | 209—121 |
| 3,046,535 | 7/1962 | Philbin | 340—199 |
| 3,072,254 | 1/1963 | Roberts et al. | 209—121 |
| 3,086,604 | 4/1963 | Fowler | 209—121 XR |
| 3,092,197 | 6/1963 | Ecker | 177—210 |
| 3,095,091 | 6/1963 | Blunt | 209—121 |
| 3,096,837 | 7/1963 | Abbott et al. | 209—121 XR |
| 3,112,805 | 12/1963 | Williams | 177—201 XR |
| 3,172,493 | 4/1965 | Von Koch | 177—210 |

FOREIGN PATENTS

| | | |
|---|---|---|
| 736,006 | 8/1955 | Great Britain. |

RICHARD B. WILKINSON, *Primary Examiner.*

R. S. WARD, *Assistant Examiner.*